United States Patent [19]
Tribbey

[11] 3,799,117
[45] Mar. 26, 1974

[54] LIVESTOCK HEADGATE

[76] Inventor: Billy F. Tribbey, 1002 S. Central, Idabel, Okla. 74745

[22] Filed: Oct. 20, 1972

[21] Appl. No.: 299,372

[52] U.S. Cl. .............................................. 119/98
[51] Int. Cl. ............................................. A61d 3/00
[58] Field of Search .................... 119/98, 99; 17/44

[56] References Cited
UNITED STATES PATENTS

| | | | |
|---|---|---|---|
| 2,895,451 | 7/1959 | Smith | 119/99 |
| 2,308,213 | 1/1943 | Shearer | 119/99 |
| 2,861,546 | 11/1958 | Stroup | 119/98 |
| 2,847,974 | 8/1958 | Londgren | 119/99 |
| 3,371,653 | 3/1968 | Anderson | 119/98 |
| 3,152,577 | 10/1964 | Sheriff | 119/99 |

Primary Examiner—Louis G. Mancene
Assistant Examiner—J. N. Eskovitz
Attorney, Agent, or Firm—Richards, Harris & Medlock

[57] ABSTRACT

A livestock headgate comprises a rectangular frame adapted for positioning at the open end of a livestock chute. A pair of opposed neck-engaging bars are pivotally supported on the bottom of the frame and are spring-biased toward open positions whereby livestock are permitted to pass through the gate. A chain and pulley system is mounted at the top of the frame and is adapted to draw the neck-engaging bars into closely spaced closed positions. The chain and pulley system is actuated by a lever which operates by toggle action to retain the neck-engaging bars in the closed positions. The actuating lever is supported on a spring-biased plate and is therefore adapted to close and retain the neck-engaging bars even though the bars are prevented from moving to the fully closed positions.

8 Claims, 4 Drawing Figures

PATENTED MAR 26 1974

3,799,117

LIVESTOCK HEADGATE

BACKGROUND AND SUMMARY OF THE INVENTION

This invention relates to livestock headgates, and more particularly to a livestock adapted for rapid and positive operation to secure animals of widely varying sizes.

Heretofore various diverse types of headgates have been used to restrain livestock, particularly cattle. All of these devices will hold animals, at least to some extent. However, many of the headgates that have been used in the past are known to be dangerous, unwieldy and slow, and complicated in operation, are undependable, and are rarely adapted for long-term, maintenance free service. For example, one type of headgate that is frequently seen on sale and in use comprises a V-shaped panel which supports the neck of an animal. This type of headgate is exceptionally undesirable in that in the event the animal slips or otherwise loses its footing, there is a possibility that the animal will by killed by breaking its neck, or that its breathing is restricted due to pressure of the V-shaped panel on its neck. In the latter case, the animal must be bodily lifted in order to relieve the pressure and thereby restore breathing. Some V-shaped panel type headgates are provided with emergency release apparatus. However, even these devices are cumbersome and complicated in operation, and are expensive due to the additional apparatus which is required to provide the release feature.

An even more dangerous type of headgate comprises a bar extending above the neck of an animal to effect its restraint. Such a bar gate is typically used in conjunction with the afore-mentioned V-shaped panel. The difficulty is that if the bar gate is made snug against the back of a neck of an animal, the V-shaped panel restricts the animal's breathing. On the other hand, if the bar gate is made sufficiently loose to permit free breathing by the animal, the animal will tend to repeatedly strike its neck against the bar, with resulting damage to the spinal cord or vertebrae. This type of headgate is so inherently dangerous that some veterinarians have expressed the opinion that its use should be unlawful.

Another type of headgate that has found relatively wide acceptance comprises two vertical neck bars. Headgates of this type are functional and substantially less dangerous to use than either the V-shaped panel or the combined V-shaped panel — bar gate type of headgate. Nevertheless, this type of headgate exhibits at least three distinctly disadvantageous characteristics.

First, the supporting linkage which is necessary in such a headgate is often so arranged that the forelegs of livestock are skinned or peeled. Second, the operator of such a headgate is required to actuate a lock chain or latch apparatus while the headgate is in the actuated condition. This is a troublesome and often very difficult task, and is also dangerous in that the handle can fly up and strike the operator. Third, such a headgate is not a walk-through type, which necessitates the use of a side gate to permit the animal to exit and a tail gate to prevent the next animal in line from going out through the side gate. In such a case it is necessary to latch the tail gate and open the side gate to permit the exit of each animal. Then the side gate must be closed and the tail gate opened to permit the entry of the next animal. Only at this point is it possible to actuate the headgate to restrain the next animal. It will thus be seen that several distinct operations must be carried out in sequence for each animal that is to be restrained. This is very time consuming and very tiring, and also often requires the use of additional personnel.

Still another type of headgate that is presently in use comprises opposed doors which are hinged on the outside of the gate and angled toward the shoulders of an animal to be restrained. In the use of such headgate, the animal inserts its head between the doors, and the doors are then pushed inwardly by the animal's forward motion until the gate is secured by a ratchet mechanism. The inherent disadvantage in this type of arrangement is that the shoulders of the animal are often bruised due to the operation of the gate. Such bruises are particularly undesirable when the livestock are being fed and fattened prior to sale for slaughter in that they can materially reduce the market price of the livestock. Also, the presence of horns on cattle make this type of headgate extremely difficult to use.

Yet another type of headgate that has been used heretofore comprises the stanchion gate. This type of headgate comprises a pair of neck-engaging bars which are pivotally supported at the bottom ends in a spaced apart relationship. The bars are adapted for pivotal movement between an open position wherein livestock are permitted to pass through the gate, and a closed positon wherein the bars engage the sides of the neck of the animal to effect restraint of the animal.

The use of the stanchion type gate results in numerous advantages over the foregoing types. Thus, neither the back of the neck nor the throat of the animal is embraced by a stanchion gate, whereby the animal is never in physical danger. Another advantage is that side pressure will permit the animal to fall or lie down without injury. Still another advantage is that the use of the stanchion gate does not require side gates, tail gates, etc., so that the entire operation is substantially faster and less complicated than would otherwise be the case.

The major disadvantage that has heretofore been encountered in the use of stanchion gates is that no mechanism has been provided for quickly and positively closing the neck-engaging bars on the neck of an animal. This is extremely troublesome, and in fact can be very dangerous in the case of a wild or charging animal. Another problem that has been experienced in the use of stanchion gates comprises the fact that such gates often must be adjusted in order to restrain various sizes of animals.

The present invention relates to a headgate of the stanchion type which overcomes the foregoing disadvantages. In accordance with the broader aspects of the invention, a pair of neck-engaging bars are adapted for manipulation between open and closed positions by means of a toggle mechanism. By this means the bars are quickly and positively actuated to the closed positions with a single motion of a self-locking handle, whereby even wild or charging animals are quickly and positively restrained. Another advantage to the invention is a provision for permitting actuation of the toggle mechanism notwithstanding the fact that the neck-engaging bars are prevented from movement to the fully closed positions. By this means animals of various sizes are restrained in the headgate without adjustment thereto.

In accordance with more specific aspects of the invention the neck-engaging bars are pivotally supported at spaced points on the bottom of a rectangular frame. The toggle mechanism includes a chain and pulley system comprising a first chain secured to one of the neck-engaging bars and extending around the pulleys to an actuating lever pivotally supported on the side of the frame. A second chain is secured to the other neck-engaging bar and extends to the first chain.

The actuating lever comprises a pivotally supported end and a handle end. The first chain of the chain and pulley system is secured to the lever at a point between the pivotally supported end and the handle end. By this means the lever functions in toggle action to pivot the neck-engaging bars from the open positions to the closed positions and thereafter to automatically lock the bars in the closed positions.

In accordance with another specific aspect of the invention, a plate is pivotally supported on the frame and in turn pivotally supports the actuating lever of the toggle mechanism. A compression spring is interposed between the plate and the frame. By this means the neck-engaging bars are adapted to securely grip animals having necks of widely varying sizes. A larger force is applied to the necks of larger animals, but this is deemed desirable since a greater force is required to restrain such animals.

Two embodiments of the invention are disclosed in the present application. Those skilled in the art will appreciate the fact that the first embodiment is similar in many respects to a headgate that has been on sale and in public use for a number of years. However, there has recently been discovered a number of modifications to the basic design which permit the headgate to accommodate even larger animals than has been possible heretofore while at the same time eliminating any possibility of bending or breaking the component parts of the headgate. These modifications include the use of a longer compression spring on the toggle supporting plate and the use of high tensile strength chain in the chain and pulley system.

The second embodiment of the invention is wholly novel. In accordance with the second embodiment, the neck-engaging bars of the headgate are provided with wings extending substantially the entire height of the headgate. By this means animals are prevented from becoming caught between the neck-engaging bars and the frame of the headgate. The added height of the wings is accommodated by moving the toggle mechanism outwardly and by inserting additional frame members between toggle mechanism and the neck-engaging bars.

DESCRIPTION OF THE DRAWINGS

A more complete understanding of the invention may be had by referring to the following detailed description when taken in conjunction with the accompanying drawings, wherein.

DETAILED DESCRIPTION

Figure 1:
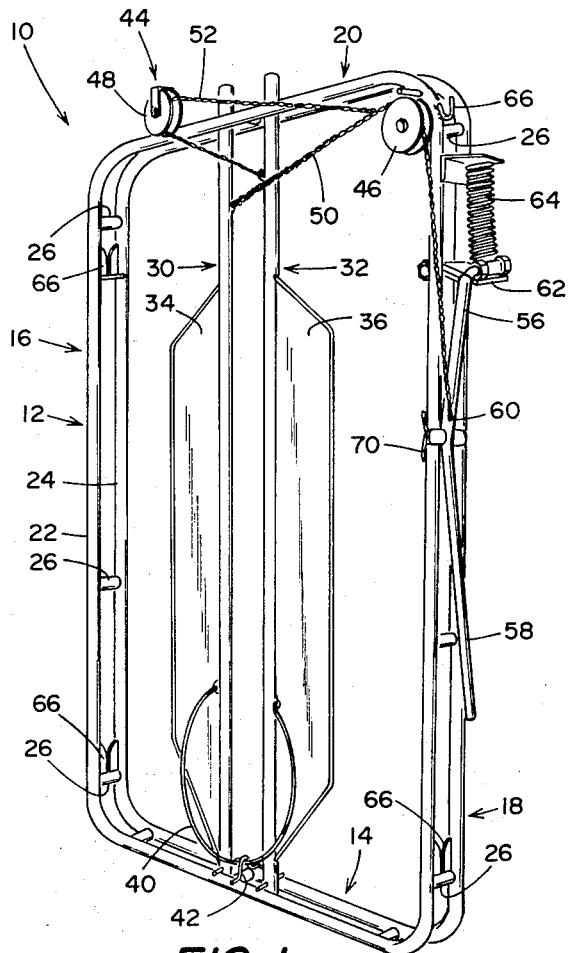
FIG. 1 is a perspective view of a livestock headgate incorporating a first embodiment of the invention.

Referring now to the drawings, and particularly to FIG. 1 thereof, there is shown a livestock headgate 10 incorporating a first embodiment of the invention. The livestock headgate 10 comprises a frame 12 which is generally rectangular in shape in that it comprises bottom portion 14, opposed side portions 16 and 18, and a top portion 20. The frame 12 is comprised of a pair of subframes 22 and 24 which are formed from steel tubing and which are maintained in the spaced, parallel relationship illustrated in FIG. 1 by means of a plurality of spacers 26.

A pair of opposed neck-engaging members 30 and 32 are pivotally supported on the bottom portion 14 of the frame 12 by means of a pair of pivot pins 34. The neck-engaging members 30 and 32 are formed from steel shafting so as to combine maximum strength with minimum diameter. The neck-engaging members 30 and 32 are provided with a pair of wings 36 and 38 which extend outwardly from the neck engaging-members. The wings 36 and 38 lend substantial stiffness to the neck-engaging members 30 and 32, and also prevent livestock from passing through the gate 10 other than between the neck-engaging members.

Figure 2:
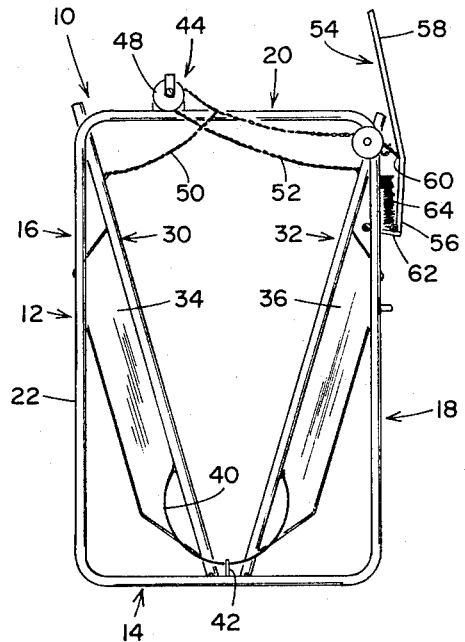
FIG. 2 is a front view of the gate shown in FIG. 1 illustrating the neck-engaging bars thereof in the open position.

A generally U-shaped spring 40 extends between the lower ends of the neck-engaging members 30 and 32, and passes through a ring 42 secured to the bottom portion 14 of the frame 12. By this means the spring 40 is positioned out of the path of livestock passing through the gate 10. The spring 40 functions to bias the neck-engaging members 30 and 32 outwardly toward the open position illustrated in FIG. 2. Outward pivotal movement of the neck-engaging members 30 and 32 is restricted by two of the spacers 26 of the frame 12. Thus, the neck-engaging members 30 and 32 are normally positioned in the angularly extending relationship illustrated in FIG. 2, whereby livestock are permitted to pass through the gate 10.

The particular livestock headgate 10 illustrated in the Drawings is specifically designed for use with cattle. In such instances it has been found that the spacing between the pivot points of the neck-engaging members 30 and 32 is preferably about five inches. If an overall width of about 42 inches is provided for the frame 12 of the gate 10, the neck-engaging members 30 and 32 will assume the orientation illustrated in FIG. 2 when in the open positions. It has been found that such an arrangement is satisfactory to permit cattle of substantially any size or age to pass through the gate 10.

A flexible linkage system 44 is provided for closing the neck-engaging members 30 and 32 against the action of the spring 40. The flexible linkage system 44 comprises a pair of pulleys 46 and 48 mounted on the top portion 20 and the side portion 18 of the frame 12, respectively. A first high tensile strength chain 50 is secured to the neck-engaging member 32 and extends therefrom around the second pulley 48 and over the first pulley 46. A second high tensile strength chain 52 is secured at one end to the neck-engaging member 30 and at the other end to the first chain 50.

Figure 3:
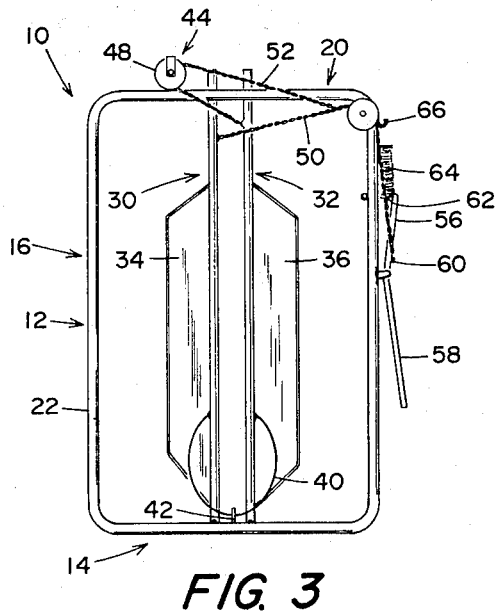
FIG. 3 is a view similar to FIG. 2 showing the neck engaging bars of the livestock headgate in the closed position.

The end of the first chain 50 remote from the neck-engaging member 30 is connected to an actuating lever 54. The lever 54 includes a pivotally supported end 56 and a handle end 58, and the chain 50 is connected to the lever 54 at a point 60 located between the pivotally supported end 56 and the handle end 58 of the lever. By this means the lever 54 operates in toggle action to first draw the neck-engaging members 30 and 32 from the open position shown in FIG. 2 to the closed position shown in FIG. 3, and thereafter to secure the neck-engaging members in the closed position. The lever 54 is supported adjacent the side portion 18 of the frame 12 so as to be readily accessible for actuation to open and close the headgate 10.

The use of a toggle mechanism to actuate the neck-engaging members 30 and 32 provides several advantages. First, the lever 54 is self-locking. This is highly desirable in that the necessity of engaging a latch, etc., to retain the handle is eliminated. Another advantage is that the handle is adapted for one-handed operation, both to open and to close the headgate 10. Still another advantage is that the lever 54 and the flexible linkage 44 combine to provide extremely high leverage operation. Insofar as is known at the present time, no other headgate actuation system provides even an approximation of the leverage that is afforded by the present design.

The end 56 of the lever 54 is pivotally supported on a plate 62 which is in turn pivotally supported on the frame 12 of the gate 10. A relatively long compression spring 64, having a length of about eight inches, is interposed between the plate 62 and the frame 12. This permits the pivotally supported end 56 of the lever 54 to move upwardly against the action of the spring 64 in the event that the neck-engaging members 30 and 32 of the gate 10 are prevented from movement to the fully closed positions illustrated in FIG. 3.

The mounting of the actuating lever 54 on the spring biased plate 62 comprises an important feature of the livestock headgate 10 in that it permits the gate to be used with cattle of widely varying size and ages without adjustment to the positioning of the neck-engaging members 30 and 32. To this end, the neck-engaging members 30 and 32 are positioned to engage the neck of a calf under light pressure when in the fully closed positions illustrated in FIG. 3. Since the head of the calf is substantially bigger than its neck, the calf is therefore securely restrained by the headgate 10. That is, the calf is prevented from moving either forwardly or rearwardly relative to the gate. At the same time, there is absolutely no danger of injuring the calf since the neck-engaging members 30 and 32 engage the sides of the neck of the calf only, and then under very light pressure.

At the other extreme the headgate 10 is also adapted to restrain fully grown bulls. In such instances the neck-engaging members 30 and 32 are prevented from movement to the fully closed positions illustrated in FIG. 3 since the neck of the bull is substantially wider than the space between the neck-engaging members when they are in the fully closed positions. This fact does not, however, prevent the successful operation of the headgate 10 since the plate 62 merely pivots upwardly against the action of the long compression spring 64 carrying the end 56 of the lever 54 therewith. By this means the lever 54 may be actuated to draw the neck-engaging members 30 and 32 from the fully opened positions toward the fully closed positions and thereafter to secure the neck-engaging members in engagement with the neck of the animal by toggle action notwithstanding the fact that the neck-engaging members are prevented from movement to the fully closed positions.

At this point the various structural features of the livestock headgate 10 will be appreciated. The frame 12 of the headgate 10 is constructed from steel tubing so as to combine high strength and light weight. By this means the headgate 10 may be transported in a pickup truck and positioned at the end of literally any open chute. Such a chute may be located either adjacent to farm or ranch buildings, or in a substantially remote location depending on the particular operation to be conducted. The headgate 10 may be secured to the end of the open chute by means of short lengths of chain (not shown) which engage slotted chain holders 66 welded to form integral parts of the frame 12.

On the other hand, the neck-engaging members 30 and 32 are preferably formed from steel shafting so as to combine maximum strength with minimum diameter. This permits the neck-engaging members 30 and 32 to press into the neck of a bull or other large animal whereby the animal is securely retained by the headgate 10. This feature of the headgate 10 is important since the neck of a bull is often larger than its head, whereby it is necessary to press the neck-engaging members into the neck of the bull in order that the animal is securely retained.

From the foregoing it will be understood that the present invention comprises a livestock headgate 10 characterized by numerous features which provide substantially improved performance over the prior art. Thus, the livestock headgate 10 incorporating the present invention is adapted for construction from a small number of easily manufactured parts, whereby the headgate is adapted for manufacture and sale at a relatively low price. By the same token, the present invention comprises an extremely strong and reliable headgate which is adapted for long-term, maintenance-free service.

The headgate incorporating the present invention further comprises several features which provide substantially improved performance over the prior art. Thus, the neck-engaging members of the headgate are adapted for movement to open positions wherein the cattle of virtually any size or age may pass through the gate. This eliminates the need of side gates or tail gates in the operation of the headgate. Another important feature is the actuating lever of the headgate, whereby the neck engaging members thereof are quickly and easily brought into engagement with the neck of an animal to secure and retain the animal in the headgate. Still another important feature comprises the spring-loaded, pivotal mounting of the actuating lever, whereby animals of virtually any size or age are securely retained in the headgate without adjustment to the component parts thereof.

An advantage to the present invention which may not be readily apparent is that the chains of the flexible linkage system 44 pass under the upper bar of the frame 12. This is considered to be highly advantageous in that an animal is prevented from throwing its head upwardly and into engagement with the frame. By this means any possibility of injury to the animal's neck or vertibrae is completely eliminated.

Another feature of the invention comprises a hook 68 and the cleat 70 secured to the frame 12 of the headgate 10. This permits a rope or chain extending from a nose tong or the like to be utilized in securing an animal's head to one side of the headgate 10. This is highly advantageous in performing such operations as taking blood samples, dehorning, drenching, etc.

Figure 4:
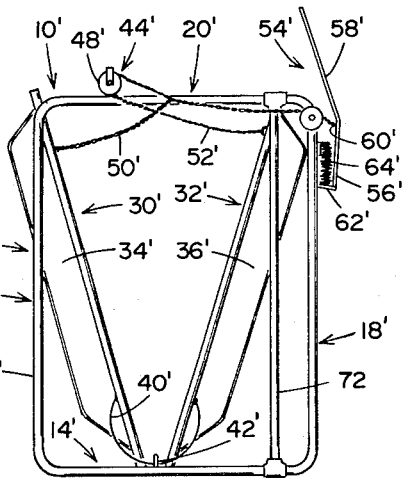
FIG. 4 is an illustration of a livestock headgate incorporating a second embodiment of the invention.

Referring now to FIG. 4, there is shown a livestock headgate 10' comprising a second embodiment of the invention. The construction and operation of the livestock headgate 10' is substantially similar to the construction and operation of the livestock headgate 10 described hereinbefore in conjunction with FIGS. 1–3. The following description of the livestock headgate 10' will therefore be confined to the differences between the headgate 10' and the headgate 10.

One of the principal features of the headgate 10' comprises the wings 34' and 36' of the neck-engaging members 30' and 32'. These wings extend substantially the full height of the neck-engaging members. It has been found that in the case of the livestock headgate 10, it is possible for an animal to leap upwardly and then to thrust its head into the open space between the upper end of the wings 34 or 36 and the frame 12. When the animal subsequently falls downwardly, its neck can become lodged between the neck-engaging members and the frame of the headgate. This possibility is completely eliminated by the use of the headgate 10', wherein the increased height of the wings 34' and 36' of the neck-engaging members 30' and 32' prevents an animal from thrusting its head into the space between the neck-engaging members and the frame of the headgate.

In order to accommodate the increased heights of the wings 34' and 36', the width of the frame 12' of the headgate 10' is increased by approximately 6 inches. The side portion 18' of the frame 12' is modified by the addition of an additional pair of vertically-extending lengths of steel tubing 72 which are positioned on the same spacing relative to the neck-engaging members 30' and 32' as the side portion 18 of the livestock headgate 10. By this means the livestock headgate 10' is adapted for the same usage as the livestock headgate 10, but it is safer in operation due to the increased height of the wings 34' and 36' of the neck-engaging members 30' and 32'.

Although preferred embodiments of the invention have been illustrated in the accompanying Drawings and described in the foregoing Detailed Description, it will be understood that the invention is not limited to the embodiments disclosed, but is capable of numerous rearrangements, modifications, and substitutions of parts and elements without departing from the spirit of the invention.

What is claimed is:

1. A livestock headgate comprising:
a rectangular frame formed from two sets of horizontally and vertically oriented parallel tubular members spaced apart in a plane perpendicular to the plane of said rectangle;
a pair of spaced apart neck-engaging bars pivotally connected to the frame at the bottom of said rectangle and extending between the sets of tubular members at the top of said rectangle;
resilient means coupling the bottoms of said neck-engaging bars to normally bias them apart;
a plate pivotally supported on the frame;
a lever arm pivotally connected to said plate on one side of said rectangle;
a flexible linkage including a pair of pulleys mounted on the frame and a pair of high tensile strength chains interconnected between said neck-engaging bars and said lever arm for drawing said bars together in opposition to said resilient means,
each said bar having a central wing section in the plane of said rectangle for preventing livestock from passing through said gate other than between said neck-engaging bars; and
a relatively long compression spring interposed between the plate and the frame to permit actuation of the lever arm even though the neck-engaging bars are prevented from moving to the fully closed position.

2. The livestock headgate according to claim 1 further characterized by said wing section of the neck-engaging bars extending substantially the full height of said bars.

3. A livestock headgate comprising:
a rectangular frame formed from two sets of horizontally and vertically oriented parallel tubular members spaced apart in a plane perpendicular to the plane of said rectangle forming a central portion adapted for positioning at the end of a livestock chute and an offset portion;
a pair of spaced apart neck-engaging bars pivotally connected to the frame at the bottom of said rectangle and extending between the sets of tubular members at the top of said rectangle;
resilient means coupling the bottoms of said neck-engaging bars to normally bias them apart;
a plate pivotally mounted on said offset portion of the frame;
a compression spring interposed between the plate and the frame;
a lever arm pivotally connected to said plate on one side of said rectangle; and
a flexible linkage interconnected between said neck-engaging bars and said lever arm for drawing said bars together in opposition to said resilient means, each said bar having a central wing section in the plane of said rectangle for preventing livestock from passing through said gate other than between said neck-engaging bars, said wing section extending substantially the full height of said neck-engaging bars.

4. A livestock headgate comprising:
a rectangular frame comprising spaced apart sets of parallel tubular members;
slotted members extending between the tubular members of the frame for receiving chain links and thereby securing the frame to the end of a livestock chute;
a pair of spaced apart neck-engaging bars supported on the frame for pivotal movement between open positions wherein the bars extend angularly upwardly and outwardly to permit livestock to pass through the headgate and closed positions wherein the bars are positioned closely adjacent and substantially parallel to one another;
a U-shaped spring interconnecting the bottoms of the neck-engaging bars and biasing the bars towards the open positions;

a plate pivotally supported on one side of the frame;

a lever arm pivotally supported on the plate for pivotal movement in the plane of the frame;

high tensile strength chain means interconnecting the lever arm and the neck-engaging bars and responsive to pivotal movement of the lever arm for drawing the neck-engaging bars toward the closed positions; and a relatively long compression spring interposed between the pivotally mounted plate and the frame for permitting actuation of the lever arm even though the neck-engaging bars are prevented from moving to the fully closed positions.

5. The livestock headgate according to claim 4 wherein each of the neck-engaging bars further includes a wing section extending outwardly from the neck-engaging bar in the plane of the frame for strengthening the neck-engaging bar and for preventing livestock from passing through the gate other than between the neck-engaging bars.

6. The livestock headgate according to claim 5 wherein the lever arm is further characterized by a pivotally supported end and a handle end, and wherein the high tensile strength chain means is connected to the lever arm at a point intermediate to the pivotally supported end and handle end so that the lever arm operates by toggle action to lock the neck-engaging bars in the closed positions.

7. A livestock headgate comprising:
a rectangular frame including a relatively wide main portion adapted to be positioned at the end of a livestock chute and a relatively narrow offset portion positioned adjacent a main portion;

a pair of neck-engaging bars pivotally supported on the bottom of the main portion of the frame and extending upwardly to the top of the frame;

resilient means coupling the bottoms of neck-engaging bars and biasing the neck-engaging bars towards open positions wherein the bars extend angularly upwardly and outwardly to permit livestock to pass through the main portion of the frames;

a plate pivotally supported on the offset portion of the frame;

a lever arm pivotally connected at one end to said plate;

a flexible linkage interconnected between the neck-engaging bars and the lever arm and responsive to pivotal movement of the lever arm for drawing the neck-engaging bars into closed positions against the action of the resilient means;

the connection between the flexible linkage and the lever arm being at a point spaced from the pivotally supported end so that the lever arm functions to lock the neck-engaging bars in the closed positions;

a pair of wings each mounted on one of the neck-engaging bars and extending substantially the entire height thereof for preventing livestock from passing through the gate other than between the neck-engaging bars; and a compression spring interposed between the pivotally supported plate and the frame for permitting actuation of the lever arm even though the neck-engaging bars are prevented from movement to the fully closed positions.

8. The livestock headgate according to claim 7 further characterized by:
pulley means including a pair of pulleys mounted at the upper end of the frame and on opposite sides thereof; and chain means including a first length of high tensile strength chain secured to the neck-engaging member mounted on the same side of the frame as the lever and extending therefrom around the pulley mounted on the opposite side of the frame from the lever and then over the pulley on the same side of the frame as the lever and hence to the lever, and a second length of high tensile strength chain secured between the neck-engaging member mounted on the opposite side of the frame from the lever and the first chain.

* * * * *